Aug. 7, 1934.  W. F. KIEFER  1,969,697
SURVEYING INSTRUMENT
Filed March 11, 1931   2 Sheets-Sheet 1
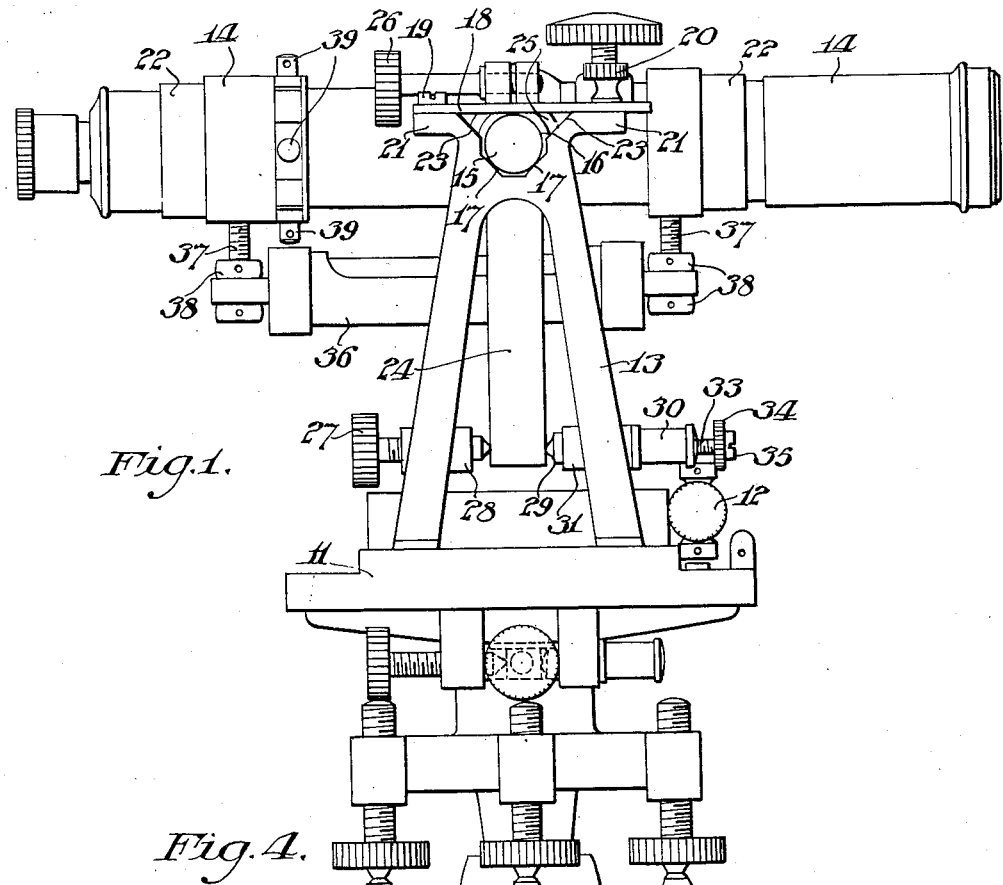
Fig.1.
Fig.4.
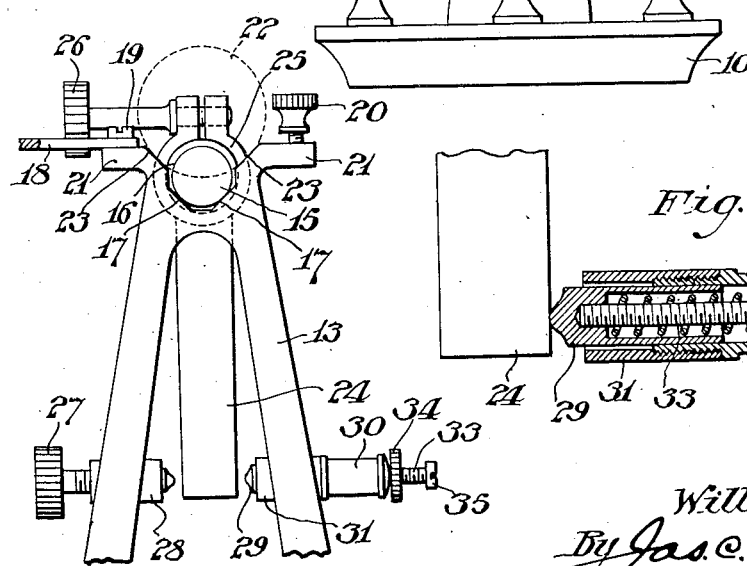
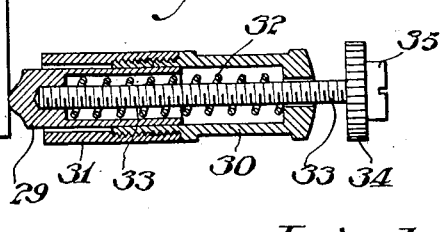
Fig.5.
Inventor:
William F. Kiefer,
By Jas. C. Hobmsmith
Attorney.

Patented Aug. 7, 1934

1,969,697

UNITED STATES PATENT OFFICE 1,969,697

SURVEYING INSTRUMENT

William F. Kiefer, Drexel Hill, Pa., assignor to Warren-Knight Company, Philadelphia, Pa., a corporation of Pennsylvania Application March 11, 1931, Serial No. 521,784

1 Claim. (Cl. 33—69)

My invention relates to surveying instruments, and it relates more particularly to such an instrument which can be used as a level, and also as a transit for running lines and grades above and below the horizontal.

The principal object of my invention is to provide a surveying instrument which, while relatively inexpensive, will have a wide range of usefulness, and which is so constructed and arranged that the adjustments of the cross wires and telescope level may be readily checked by the user, whereby accuracy of the results may at all times be assured.

With the foregoing object in view, my invention contemplates the provision of means whereby the adjustments of the cross wires and telescope level may be checked in the same manner as is customarily done with a Y level, and this without undue complication of the instrument.

The nature and characteristic features of my invention will be more readily understood from the following description, taken in connection with the accompanying drawings forming part hereof, in which:

Figure 1 is a side elevation of a surveying instrument embodying the main features of my present invention;

Figure 2:
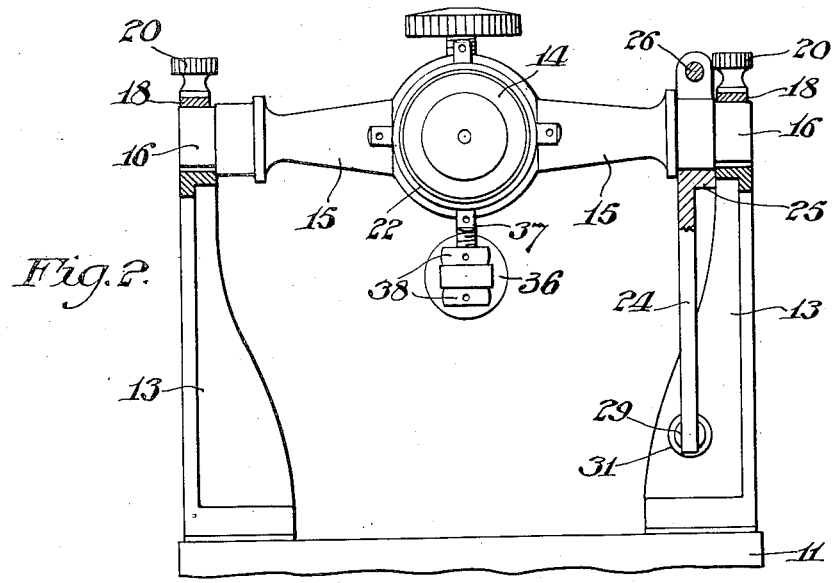
Fig. 2 is an end elevation thereof, certain parts being shown in section.
Figure 3:
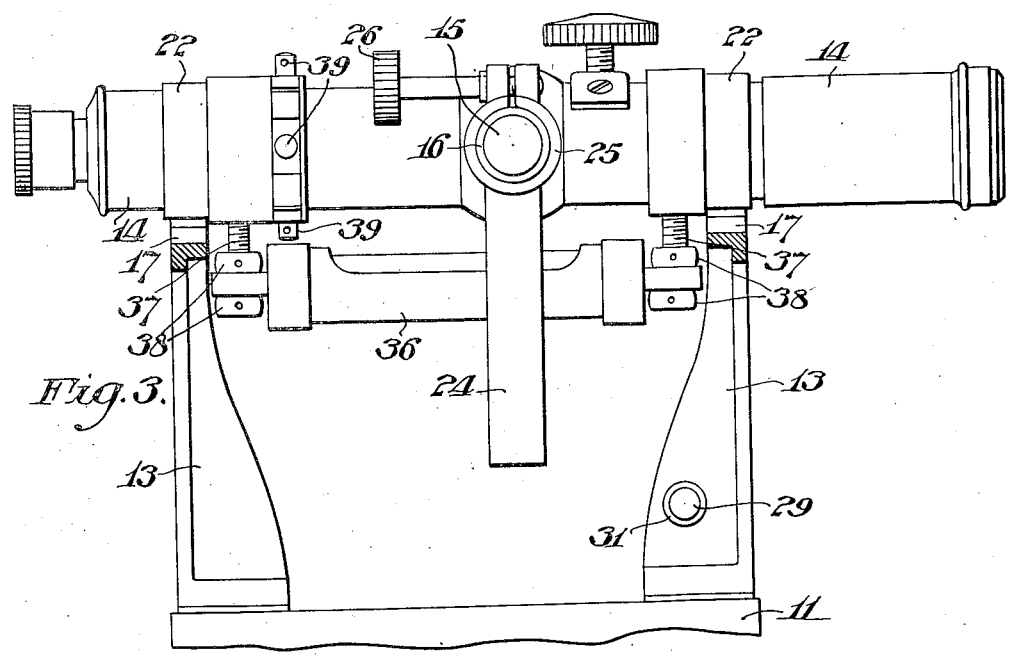
Fig. 3 is a view similar to Fig. 2, but with the telescope positioned in the test bearings provided for the purpose of making tests for accuracy of the adjustments of the cross wires and telescope level.

Fig. 4 is a fragmentary detail view, illustrating a portion of the instrument shown in Fig. 1, but with certain of the parts in the positions assumed when the telescope is about to be removed from the main bearings for the purpose of placing it in the test bearings; and Fig. 5 is an enlarged sectional detail showing the construction and arrangement of a spring tension device used in the instrument, having means for withdrawing the same when the telescope is to be removed from the main bearings.

It will, of course, be understood that the description and drawings herein contained are illustrative merely, and that various modifications and changes may be made in the structure disclosed without departing from the spirit of my invention.

Referring to the drawings, in the particular embodiment of my invention therein shown, 10 is the usual tripod plate, which is secured in the customary manner to a tripod (not shown).

The "top plate" 11 of the instrument is mounted upon the tripod plate 10 in the ordinary manner, so that the usual movements and adjustments with respect thereto may be made. The top plate 11 is provided with the usual level 12 for effecting the initial set-up of the instrument with the top plate properly leveled.

A pair of standards 13 are secured to the top plate 11, extending upwardly therefrom. A telescope 14 is mounted in the standards 13 by means of an axle 15, which is permanently and rigidly secured to the telescope with its axis at right angles to the longitudinal axis of the telescope. The bearing portions 16 of the axle 15 normally rest in main bearings of the V type provided by inclined surfaces 17 at the upper end portions of the standards 13. The inclined surfaces 17 serve to insure the accurate horizontal position of the axis of the telescope axle 15.

The bearing portions 16 of the telescope axle 15 are normally held within the main bearings by means of retaining bars 18, which normally extend over the bearing portions. Each of the bars 18 is secured to its standard by means of a pivot screw 19 at one end, and a thumb screw 20 at the other end. The pivot screws 19 and thumb screws 20 are threaded in suitable extensions 21 provided at the upper ends of the standards 13.

The telescope 14 is also provided with a pair of collars 22, located from each other a distance corresponding to the distance between the standards 13. The axis of each of the collars 22 coincides with the longitudinal axis of the telescope.

Each of the standards 13 is also provided with inclined surfaces 23, forming auxiliary bearings to receive the collars 22 provided on the telescope, when the adjustments of the cross wires and telescope level are to be tested. The position of the collars in the auxiliary bearings is indicated in dotted lines in Fig. 4.

A depending arm 24 is mounted upon the axle 15 of the telescope, having a split collar portion 25 encircling the same, and being adapted to be clamped thereto by a thumb screw 26. It will, of course, be understood that when the thumb screw 26 is turned to release the tension of the encircling collar 25 of the arm 24, the telescope may be moved to various angular positions in a vertical plane.

To effect the final adjustment of the angular positions of the telescope in its normal operation, as well as for accurately leveling the same, there is provided an adjusting screw 27, the end of which bears against the lower end of the arm 24. The screw 27 is threaded in a lug 28 provided on one of the legs of one of the standards 13.

For the purpose of holding the lower end of the depending arm 24 against the adjusting screw 27, there is provided a spring device, shown in enlarged detail in Fig. 5 of the drawings. The same comprises a hollow plug 29, the outer end of which normally bears against the lower end of the depending arm 24, in alinement with and opposite to the end of the adjusting screw 27.

The plug 29 is slidably mounted in a barrel 30, which in turn is mounted in a lug 31 carried by one of the legs of one of the standards 13. A spring 32 is mounted in the interior of the plug and barrel, bearing at one end against a portion of the plug, and at the other end against a portion of the barrel, thereby tending to push the plug forwardly.

A threaded rod 33 is also secured at one end to a portion of the plug 29, and the other end thereof extends through the rear end of the barrel 30. A thumb nut 34 is mounted upon the threaded rod 33, and is retained thereon by means of the head 35 of a screw which is mounted at the end of the rod 33.

By the foregoing arrangement, the thumb nut 34 may be advanced upon the threaded rod 33, thereby to withdraw the plug 29, against the tension of the spring 32, away from contact with the lower end of the depending arm 24. By this arrangement, the lower end of the arm 24 may be freely withdrawn when it is desired to remove the telescope from the main bearings and place the same with its collars in the auxiliary bearings provided by the inclined bearing surfaces 23. In the normal use of the instrument, the thumb nut 34 may be retracted by threading it backwardly upon the rod 33 until the same bears against the screw head 35.

The telescope is of course provided with the usual level 36, which is adjustably secured thereto in any preferred manner, such as by means of the threaded bolts 37 and adjusting nuts 38. The telescope is also provided interiorly with the customary cross wires (not shown), which may be adjusted by means of the protruding adjusting screws 39.

The normal operation of the instrument is substantially the same as that of the ordinary transit. When, however, it is desired to test the accuracy of the adjustments of the telescope level and the cross wires, the procedure is as follows:

The thumb nut 34 is first advanced upon the threaded rod 33 a sufficient distance to retract the plug 29 against the tension of the spring 32, from contact with the lower end of the depending arm 24, which is mounted upon the axle of the telescope (see Fig. 4). If desired, the adjusting screw 27 may also be retracted to some extent. In this manner, the lower end of the depending arm 24 is freed from engagement with its adjusting devices, and may thereafter be freely removed and subsequently replaced without interference therefrom.

The retaining bars 18 are now freed from engagement with the bearing portions 16 at the ends of the axle 15 of the telescope. For this purpose, the thumb screws 20 are loosened, and the bars 18 swung outwardly about the pivots provided by the screws 19.

The telescope and its associated parts may now be freely removed by lifting the same out of the main bearings. The telescope may now be turned ninety degrees horizontally, and the collars 22 may then be positioned in the auxiliary bearings provided by the inclined surfaces 23. While so mounted in the auxiliary bearings thus provided, the several customary tests may be made for the accuracy of the adjustments of the cross wires and telescope level.

It will, of course, be understood that the test for the accuracy of the cross wires may be readily made by mounting the telescope with its collars in the auxiliary bearings 23, and observing the cross wires with the same sighted upon a certain spot, the telescope being rotated to various positions about its horizontal axis.

It will also be understood, by those familiar with instruments of this type, that the test of the telescope level may be made by first mounting the telescope with its collars 22 in the auxiliary bearings 23, and bringing the same to a level, after which the telescope is lifted out and turned end for end and replaced with its collars in the auxiliary bearings 23, so that any inaccuracy of the level may be observed.

I claim:

In a surveying instrument, a pair of bearing standards, a telescope, an axle for mounting said telescope in said standards, said telescope being removable from said standards for testing purposes, an extending arm mounted on the axle and adapted to be clamped thereto in various angular relationships with respect to the telescope, means for effecting fine adjustments of the angular position of the telescope comprising an adjusting screw bearing against one side of said extending arm, a spring device having a plug normally bearing against the other side of said extending arm, a spring normally impelling said plug forwardly, a rearwardly extending threaded rod carried by said plug, and a thumb nut mounted on said rod adapted when advanced thereon to hold the plug out of engagement with the extending arm.

WILLIAM F. KIEFER.